United States Patent Office 3,020,797
Patented Feb. 13, 1962

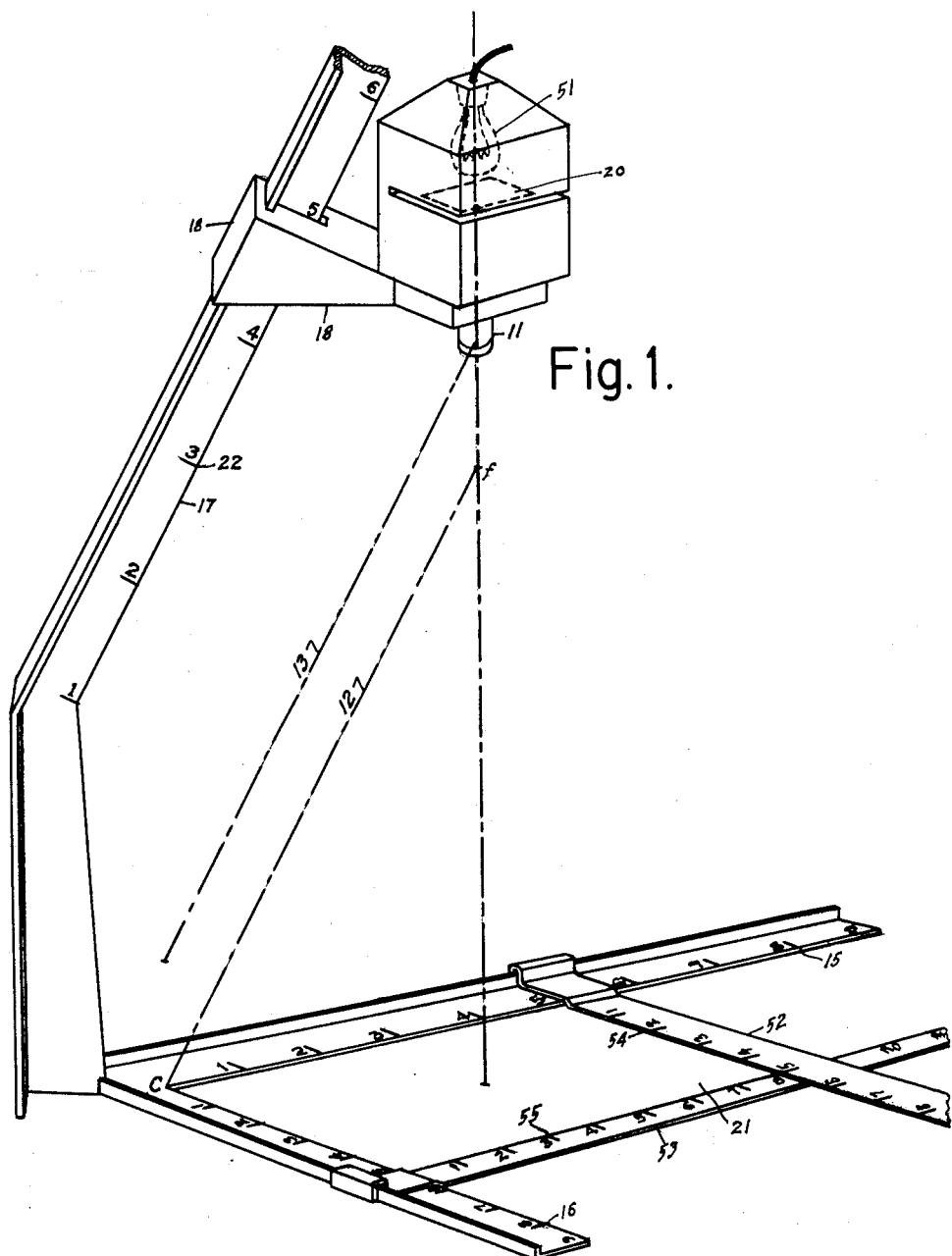

3,020,797
PROJECTOR IMPROVEMENTS
Allan Broms, Beechhurst, N.Y.
(132—45 Maple Ave., Flushing, N.Y.)
Filed Nov. 9, 1956, Ser. No. 621,326
4 Claims. (Cl. 88—24)

This invention relates to the art of optical projection and photographic enlargement of films, slides and the like through the lens of a projector to a flat surface such as a screen or sensitized paper.

The present application is a continuation in part of my prior application Serial No. 165,937, filed June 3, 1950, now Patent No. 2,772,599, which is a continuation in part of my prior application Serial No. 606,904, filed July 25, 1945, now abandoned. Also related are my U.S. Patent 2,741,945, issued April 17, 1956, and entitled "Copying Camera Assembly," and two applications of even date herewith entitled "Copying Camera Improvements," filed November 9, 1956, now Patent No. 2,882,790, issued April 21, 1959, and "Scanning Camera Assembly," Serial No. 621,325, filed November 5, 1956, now abandoned. The present application relates to improvements rendering more efficient as a projector, the inventions of my said prior applications.

To fit either the dimensions or proportions of originals or enlargements, or for other purposes, it is often desired to alter the dimensions of the projector frame aperture or the field area by masking or like means. It is also often advantageous to predetermine the projection ratio precisely, or the exact dimensions, position and limits of the projected image as thus altered and at a given projection ratio.

The primary object of this invention is to provide improved mechanical means whereby these ends may be accomplished simply, conveniently, positively and accurately. The apparatus is for purpose of illustration only, and does not define the limits of this invention.

FIGURE 1 is a perspective view of apparatus embodying part of the present invention.

In my Patent 2,741,945 and application Serial No. 165,937, I secure precise fixation of two edges and one corner of the field area projection through the lens of the limiting frame aperture of a camera or projector, at all relative conjugate focal distances of the aperture and field planes, and therefore at all ratios of copying or projection. Furthermore I do this by merely two straight-line adjustive movements, namely: relative movement of the frame aperture coaxially of the lens; and relative movement of the lens and/or field area parallel to a straight line drawn from the principal focal point of the lens on the field side thereof to a corner of the projected field image of the frame aperture, when the planes of the aperture and field are in conjugate focus.

To facilitate comparison, the reference designations of said patent and co-pending application are similarly used in this application. More directly pertinent to the improvements of this application are the following reference designations: the lens 11; the frame aperture 20 and its conjugate projection through the lens as the field area 21; the support beam 17 and its scale 22; the sliding bracket 18; and the abutment members and their scales 15 and 16.

In FIGURE 1, on that side of the frame aperture 20 and of the film or slide opposite the lens 11, is provided suitable means 51 for illuminating said aperture, film or slide for the purpose of bright projection to the field plane.

In the practice of photographic enlargement, it is often desired to limit the area being enlarged or printed, generally by masking. Such masking may be done merely to provide white borders around a darker print enlargement, or it may be done to crop the print to a limited portion of the full field area projected.

In FIGURE 1 are shown two masking blades 52 and 53 extending intersectingly across the field area with inner edges at right angles respectively to the abutment members 15 and 16, and attached thereto for lateral adjustive movement along said members.

On the masking blades 52 and 53 are provided graduated scales 54 and 55, with the zero point of each scale at the inner edge of the abutment member along which it slides. The graduations of each blade scale could be made equal to those of its parallel abutment member, which are preferably equal respectively to the parallel dimensions of the frame aperture and indicate the ratio of copying or projection. However, to widen usefulness, the blade scale graduations are preferably made equal to some standard unit of measurement, such as the inch or centimeter. Then the abutment member scales can be used to measure the field in terms of projection ratios, while at the same time the masking blade scales measure that area or a portion thereof in terms of actual dimensions as shown at the intersection of the inner edges of the blades.

For example, it is desired to project an enlargement of a film frame to a sheet of sensitized paper of given dimensions. The two masking blades are first set so that their inner edges intersect at scale points corresponding to those given dimensions. When so set, those inner blade edges also indicate on the abutment member scales the projection ratio required, so that the bracket 18 and frame aperture 20 may be placed accordingly along respective setting scales. Everything is thus made ready for the actual projection printing as planned.

Or it is desired to crop, so that only a portion of the original film frame is printed, say an interior portion of *half* the dimensions of the full frame aperture. The masking blades are first set to the size of the print desired, as measured on the blade scales. The bracket 18 and frame aperture 20 are then adjusted to a projection ratio *twice* that indicated by the blades on the abutment member scales (*twice* being the inverse of the *half* dimensions used). The film itself is then moved relative to the frame aperture to fit the desired portion of the frame into the field area as thus circumscribed and reduced. Two edges of the frame aperture are then projected through the lens as the two fixated edges of the cropped field area, while the inner blades edges delimit the other two edges of the cropped field area.

The above examples illustrate but two of the many ways in which the combination of field ratio scales and dimensional masking blade scales facilitate solutions of practical problems of enlarging dimensions and proportions.

Among the advantages resulting from my invention are the following:

By reason of the precise fixation of two adjacent edges of the field area, the viewing screen or sensitized enlargement paper can be instantly and positively placed in correct position against two fixed guide abutments.

Also by reason of such precise fixation of said edges, the zero of each of the several field scales is likewise kept fixated, so that correct scale readings are always indicated at all projection ratios.

The dimensions of a given screen, sensitized paper sheet or desired field area can be read instantly on the masking blade scales, and delimited by placing of the masking blades accordingly.

The projection ratio required to cover any given size of screen, sensitized paper sheet or desired field area can be read instantly on the abutment member scales.

The projector can accordingly be then placed instantly and positively in proper position on the support beam and adjusted instantly and positively to sharp conjugate focus.

Rectangular masking for any purpose and in any manner can be done easily, positively and accurately by combined use of the abutment members 15 and 16 and the masking blades 52 and 53, and their several scales.

The foregoing description sets forth my invention in its preferred practical form, but the invention is to be understood as fully commensurate with the appended claims.

Having thus fully described the invention, what I claim as new and desire to secure by Letters Patent is:

1. In a projection optical system having a lens, a frame member to support a transparency with a limiting aperture at one side of said lens, and a field locating member at the other side of said lens, with means for guiding the frame member for focusing movement, and with said field locating member and lens relatively movable with respect to one another, and a straight supporting guide for directing movement of at least one of said lens and field member parallel to a straight line drawn from the principal focal point of the lens on the field side thereof to a corner of the field image of the aperture as projected through the lens when the planes of said aperture and field are in conjugate focus, combined with elongated abutment members on the field locating member arranged parallel to the edges of the frame aperture and having thereon scales the zeros of which are at said corner of the field image and the unit divisions of which are respectively equal to the parallel dimensions of the frame aperture and wherein the straight supporting guide is provided with a scale for setting at least one of said lens and field member and correlated with the scales of the abutment members: masking blades attached to slide along each of said abutment members, each masking blade extending across the field area with its inner edge normal to the inner edge of the abutment member to which it is attached, and each of said masking blades being provided at its inner edge with a scale of dimensional units the zero of said scale being at the inner edge of the abutment member to which said blade is attached, whereby the positions and scales of the masking blades indicate the size of the field image and by their positions on the abutment scales indicate the proper ratio of enlargement and the proper settings of at least one of said lens and field member relative to the scale on the straight supporting guide and of the frame member in conjugate focus with the field area.

2. In a projection optical system having a lens, a frame member to support an original being projected with a limiting aperture at one side of said lens, and a field locating member at the other side of said lens, with means for guiding the frame member for focusing movement, and with said field locating member and lens relatively movable with respect to one another, and a straight supporting guide for directing movement of at least one of said lens and field member parallel to a straight line drawn from the principal focal point of the lens on the field side thereof to a corner of the field image of the aperture as projected through the lens when the planes of said aperture and field are in conjugate focus, combined with elongated abutment members on the field locating member arranged parallel to the edges of the frame aperture and having thereon scales the zeros of which are at said corner of the field image and the unit divisions of which are respectively equal to the parallel dimensions of the frame aperture and wherein the straight supporting guide is provided with a scale for setting at least one of said lens and field member and correlated with the scales of the abutment members: masking blades attached to slide along each of said abutment members, each masking blade extending across the field area with its inner edge normal to the inner edge of the abutment member to which it is attached, and each of said masking blades being provided at its inner edge with a scale of dimensional units the zero of said scale being at the inner edge of the abutment member to which said blade is attached, whereby the positions and scales of the masking blades indicate the size of the field image and by their positions on the abutment scales indicate the proper ratio of enlargement and the proper settings of at least one of said lens and field member relative to the scale on the straight supporting guide and of the frame member in conjugate focus with the field area.

3. In a projection optical system having a lens, a frame member to support a transparency with a limiting aperture at one side of said lens, and a field locating member at the other side of said lens, with means for guiding the frame member for focusing movement, and with said lens movable with respect to said field member, and a straight supporting guide for directing movement of said lens parallel to a straight line drawn from the principal focal point of the lens on the field side thereof to a corner of the field image of the aperture as projected through the lens when the planes of said aperture and field are in conjugate focus, combined with elongated abutment members on the field locating member arranged parallel to the edges of the frame aperture and having thereon scales the zeros of which are at said corner of the field image and the unit divisions of which are respectively equal to the parallel dimensions of the frame aperture and wherein the straight supporting guide is provided with a lens setting scale correlated with the scales of the abutment members: masking blades attached to slide along each of said abutment members, each masking blade extending across the field area with its inner edge normal to the inner edge of the abutment member to which it is attached, and each of said masking blades being provided at its inner edge with a scale of dimensional units the zero of said scale being at the inner edge of the abutment member to which said blade is attached, whereby the positions and scales of the masking blades indicate the size of the field image and by their positions on the abutment scales indicate the proper ratio of enlargement and the proper settings of the lens relative to the scale on the straight supporting guide and of the frame member in conjugate focus with the field area.

4. In a projection optical system having a lens, a frame member to support an original being projected with a limiting aperture at one side of said lens, and a field locating member at the other side of said lens, with means for guiding the frame member for focusing movement, and with said lens movable with respect to said field member, and a straight supporting guide for directing movement of said lens parallel to a straight line drawn from the principal focal point of the lens on the field side thereof to a corner of the field image of the aperture as projected through the lens when the planes of said aperture and field are in conjugate focus, combined with elongated abutment members on the field locating member arranged parallel to the edges of the frame aperture and having thereon scales the zeros of which are at said corner of the field image and the unit divisions of which are respectively equal to the parallel dimensions of the frame aperture and wherein the straight supporting guide is provided with a lens setting scale correlated with the scales of the abutment members, masking blades attached to slide along each of said abutment members, each masking blade extending across the field area with its inner edge normal to the inner edge of the abutment member to which it is attached, and each of said masking blades being provided at its inner edge with a scale of dimensional units the zero of said scale being at the inner edge of the abutment member to which said blade is attached, whereby the positions and scales of the masking blades indicate the size of the field image and by their positions on the abutment scales indicate the proper ratio of enlargement and the proper settings of the lens relative to the scale on the straight supporting guide and of the frame member in conjugate focus with the field area.

References Cited in the file of this patent

UNITED STATES PATENTS

| | | |
|---|---|---|
| 1,535,041 | Ruhmann | Apr. 21, 1925 |
| 1,579,741 | Verburg | Apr. 6, 1926 |
| 1,994,091 | Shwartz | Mar. 12, 1935 |
| 2,188,622 | Cantor | Jan. 30, 1940 |
| 2,199,304 | Dewey | Apr. 30, 1940 |
| 2,303,920 | Drucker | Dec. 1, 1942 |
| 2,315,066 | Lund | Mar. 30, 1943 |
| 2,342,525 | Berry | Feb. 22, 1944 |
| 2,741,945 | Broms | Apr. 17, 1956 |

FOREIGN PATENTS

| | | |
|---|---|---|
| 492,059 | Italy | Mar. 15, 1954 |